United States Patent Office 3,332,018
Patented July 18, 1967

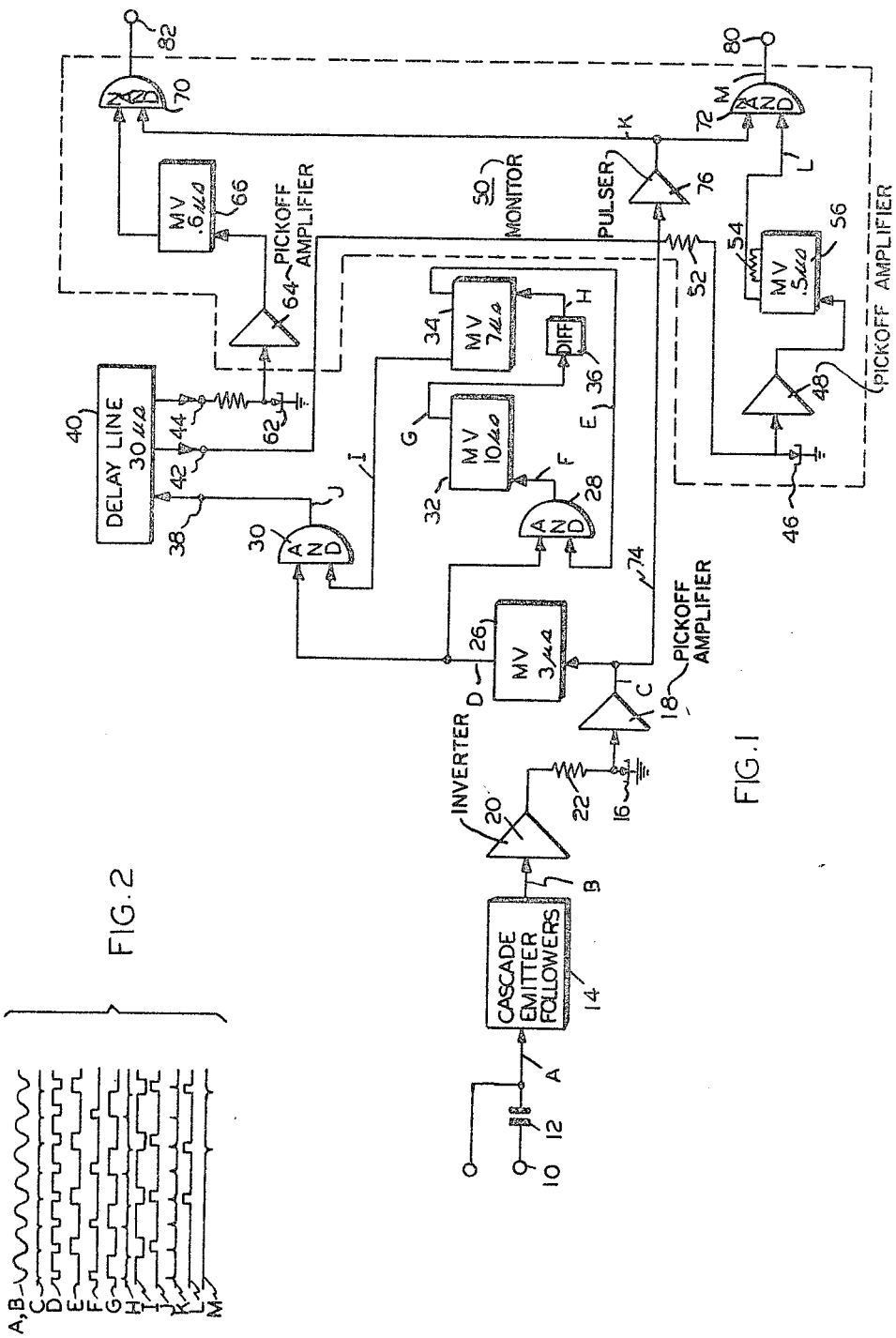

3,332,018
DECODER AND REFERENCE BURST PULSE SPACING MONITOR CIRCUIT
Dean S. Thornberg and Richard M. Jepperson, Salt Lake City, Utah, assignors to Montek Division of Model Engineering and Manufacturing Corporation, Salt Lake City, Utah, a corporation of Indiana
Filed Dec. 2, 1963, Ser. No. 327,307
4 Claims. (Cl. 325—322)

ABSTRACT OF THE DISCLOSURE

In an omnidirectional radio beacon navigation system, North reference burst and auxiliary burst pulse pairs are decoded and monitored by comparing the spacing of the received pulse pairs with a predetermined spacing. A voltage spikes is produced for each North reference and auxiliary pulse pair whose spacing is within preset tolerance of the predetermined spacings.

---

The present invention relates to a monitoring circuit for use in an omnidirectional radio beacon, or other type of radio beacon, in which North reference burst pulses are decoded by logic circuitry and then upon such decoding, the spacing is monitored to produce a North reference burst acceptance pulse and an auxiliary burst acceptance pulse.

More particularly, the invention is generally directed to a beacon system such as an omnidirectional radio navigational beacon in which is generated a North reference burst acceptance pulse having been decoded from at least ten pulse pairs with 30 ±0.3 microsecond spacings between the pulse pairs without missing any pulses, and in which is further generated an auxiliary burst acceptance pulse decoded from at least five pulse pairs with 24 ±0.25 microsecond spacings, or even a greater spacing consistent in magnitude, the spacings existing between the pulse pairs without missing any pulses of the ten pulse pair.

The decoder and reference burst pulse spacing monitor circuit is useful in tactical air control and navigation equipment to provide accurate and useful information when the bursts are in pairs of pulses configured as composite video signals or pulses each generally shaped as a Gaussian curve, from which may be derived decoded reference pulses and auxiliary pulses when the pairs of pulses are recurring in time and are disposed with specified other characteristics determined within predetermined tolerances. The circuit of the invention may comprise the use of semiconductors such as tunnel diodes and transistors, and other electrical components, and the transistors may be arranged to circuit configurations to consist of well-known circuit units such as emitter followers, amplifiers, delay circuits such as delay lines and monostable, multivibrator, AND gates, and NAND gates.

The above objects and advantages of the invention will become apparent upon a full consideration of the following detailed description and accompanying drawings in which:

FIGURE 1 is a block circuit diagram, a portion of which is shown schematically, of a decoder and a reference burst pulse spacing monitor circuit in accordance with a preferred embodiment; and FIGURE 2 is a typical waveform time chart of pulses or pulse pairs developed and present at various parts of the monitor circuit of FIGURE 1.

Referring now to the drawings, there are random pairs of shaped or modulated RF input pulses applied to a terminal 10. The input pulses are a composite video signal and the shape of each of the pair is a Gaussian modulation, which is merely a statistical type curve as shown. Terminal 10 may be on a printed circuit board, which circuit board may include most, if not all, of the circuit components shown in block or schematic form in FIGURE 1. The video input pulses applied to terminal 10 are coupled through a coupling capacitor 12 to a set of cascaded emitter followers 14 and thence to tunnel diode 16 and a pickoff amplifier 18. FIGURE 2 illustrates waveform A, B as the shaped pulse pairs present at points A and B, which represent the input and output waveform of the pulses applied to the cascaded emitter followers 14.

The tunnel diode 16 is shown connected to the cascade emitter followers by transistor amplifier inverter 20 and a resistance 22. The tunnel diode taken with the resistance value is set to trip at a given and precise level on each pulse received by the tunnel diode 16 and with the coupling of the tunnel diode to the pickoff amplifier 18, the pickoff amplifier produces a sharp output pulse from the pickoff point determined by the tunnel diode. The sharp output pulse is shown as waveform C, and this output assures a precise reference point for pulse spacing measurement in decoding the composite video when within a predetermined tolerance. The sharp output pulses are applied to trigger a 3 microsecond delay monostable multivibrator 26 which in turn produces an output waveform D.

The output pulse of the multivibrator 26 is applied to AND gates 28, 30. AND gate 28 is conditioned to pass pulses applied to it when waveforms D and E are negative-going pulses, and when these simultaneously condition the AND gate 28, it produces an output waveform F, the positive-going leading edge of which is applied to the nonconducting side of a 10 microsecond delay monostable multivibrator 32. When the delay multivibrator 32 is thus energized, it produces a positive-going 10 microsecond pulse for the first pulse of each input pair, as illustratively shown by waveform G. It is here noted that the waveform E is taken from the normally conducting side of the 7 microsecond delay monostable multivibrator 34, so that its output voltage will thus be in the low state at the time of receiving the first pulse pair at AND gate 28.

The waveform G derived from the delay multvibrator 32 is applied to a differentiator circuit 36 to produce the differentiated waveform H and the negative-going spike produced from the trailing edge of the waveform G, is used to trigger the 7 microsecond delay monostable multivibrator 34 for producing therefrom the waveform E, which has been described as a positive pulse being applied to inhibit the AND gate 28 for preventing the formation of a second 10 microsecond pulse by the multivibrator 32 when a second pulse of the pulse pair is applied to the AND gate 28. Also from the 7 microsecond delay multivibrator there is taken a negative-going 7 microsecond pulse waveform I, and this waveform I embraces the latter portion of a 10 to 17 microsecond period commencing after the leading edge of the first pulse of a pulse pair. This negative-going waveform I conditions AND gate 30 for allowing the second pulse of each pulse pair to pass the AND gate 30 and produce a waveform J, shown in FIGURE 2.

The waveform J represents decoded pulse pairs produced by the AND gate 30 which are applied from a terminal 38 to the input side of a delay line 40 which is a 30 microsecond tapped delay line of substantial accuracy in time over a temperature range of −28° to +85° C., and has an output tap at the 29 or 30 microsecond delay time as well as some intermediate value proximate to the end of the line, such as at a tap for deriving a 23 or 24 microsecond delay time. Thus, it is seen that the delay line will then be driven by the second pulse of each pair of the composite video having been applied to terminal fier of the cascade emitter followers 14 and the pulse pair and burst decoder of the multivibrators 26, 32, 34, and AND gates 28, 30. The decoding of all pulse pairs is thus guaranteed.

As has been described above, the delay line 40 has at least two output tap terminals 42, 44 connected to the printed circuit board described in connection with terminal 10. The delay line through its output terminal 42 provides a delayed output of, say, approximately at least 23 microseconds and the terminal 44 provides a delayed output of, say, approximately at least 29 microseconds. The 23 microsecond delayed pulse is applied from terminal 42 to tunnel diode 46 and a 23.75 microsecond pickoff amplifier 48 of a reference burst separator and pulse spacing monitor 50, in which the amplifier produces a negative-going output used to trigger a 0.5 microsecond delay monostable multivibrator 56 for developing a positive-going pulse waveform L. The pulse waveform L is used as acceptance gating pulses for auxiliary reference bursts.

As is well known, the trip point of the tunnel diode 46 and the period of the multivibrator 56 may be accordingly adjusted over a small range to provide an adjustable acceptance tolerance of the acceptance gating pulses of waveform L, and such adjusting is accomplished by selectively adjusting the value of resistance 52 to determine the precise trip point of the tunnel diode, and adjusting the value of resistance 54 to determine the width of the acceptance gating pulses. Also the resistance 52 may be interchanged with other resistance values to adjust the pickoff point voltage of the amplifier 48. These resistors 52, 54 are of course readily accessible on the printed circuit board described above such as in connection with terminal 10, and these resistors may be so interchanged to change the monitoring tolerance of the entire circuit.

The delay line through its output terminal 44 applies the 29 microsecond delayed pulse to a tunnel diode 62 and a 29.7 microsecond pickoff amplifier 64 of the monitor 50. The output of the amplifier is a negative-going pulse used to trigger a 0.6 microsecond delay monostable multivibrator 66 for developing a positive-going pulse 0.6 microsecond wide, similar but not identical to the 0.5 microsecond waveform L. The 0.6 microsecond wide waveform is used as acceptance gating pulses for a North reference burst. The acceptance gating pulses produced by each multivibrator 56, 66 are used and applied to condition respective NAND gates 70, 72.

As has been described above in connection with the pickoff amplifier 18 in producing the waveform C, the waveform C is coupled over conductor 74 to a 0.1 microsecond amplifier or pulser 76 to emerge therefrom as 0.1 microsecond positive-going spikes or pulses shown as waveform K which has extremely fast rise and fall times. This waveform I is applied from the pulser 76 to each of the NAND gates 70, 72 in parallel, and unless the conditioning positive-going pulses are present at these NAND gates as acceptance gating pulses, the 0.1 microsecond pulses are inhibited; thus only the North reference burst will pass the NAND gate 70, and only the auxiliary burst will pass the NAND gate 72.

Since the first pair of pulses of each burst is lost in the monitor circuit by decoding, five negative-going spikes will appear at an output terminal 80 of the auxiliary NAND gate 72 as shown by waveform M, which assumes the correct six pairs of pulses which have been present in any auxiliary burst. There are accordingly eleven negative-going spikes at the output terminal 82 of the North NAND gate 70 which correspondingly assumes the correct twelve pairs were present in the North burst. These spikes are only produced where the North reference pulse pair spacing is within the tolerances preset by the adjustments of the delay pickoff points of the pickoff amplifiers 18, 48, 64, and by the adjustments of the delay multivibrators 26, 32, 34, 56, 66.

and the decoded auxiliary burst are respectively applied to a North burst pulse count monitor (not shown) and an auxiliary burst pulse count monitor.

Thus it is seen that monitoring of reference burst pulse spacing and pulse decoding may be achieved in a beacon system, such as the AN/URN-3 which is an omnidirectional radio beacon navigation system, by generating a North reference burst acceptance pulse decoded from at least ten pulse pairs with 30±0.3 microsecond spacings between the pulse pairs without missing any pulses and by generating an auxiliary burst acceptance pulse decoded from at least five pulse pairs with 24±0.25 microsecond spacings, or a greater spacing, between the pulse pairs without missing any pulses.

It is understood that the specific circuit herein illustrated and described in detail is intended to be representative only, as there are many changes which may be made therein without departing from the clear teachings of the invention. Accordingly, reference should be made to the following claims in determining the full scope of the invention.

What is claimed is:

1. A decoder and reference burst pulse spacing monitor circuit for decoding a composite video signal comprising at least one emitter follower stage, the first of such stages having the composite video signal applied thereto, a tunnel diode and pickoff amplifier connected to the output of the emitter follower and set to trip at a precise level of the video derived from the emitter follower stage, a short delay multivibrator triggered by the pickoff amplifier and developing a delayed pulse, a pulser also triggered by the pickoff amplifier, a long delay multivibrator, a pair of AND gates each conditioned by the short delay multivibrator and the long delay multivibrator for producing a decoded pulse from the composite video, a tapped delay line having a plurality of taps fed by one of the AND gates, said long delay multivibrator triggered by the other of the pair of AND gates, a tunnel-diode-and-pickoff-amplifier circuit connected to each tap of the tapped delay line so that the tap having the short delay is connected to the pickoff-amplifier circuit having the long pickoff point and the tap having the long delay is connected to the pickoff amplifier circuit having the short pickoff point, said pickoff points being selected by the respective tunnel diodes of said pickoff-amplifier circuits, and a pair of NAND gates each connected to be conditioned by a pickoff amplifier and the pulser for developing from each of the NAND gates an acceptance pulse within given tolerances of spacing between the pulses of the composite video.

2. A decoder and reference burst spacing monitor circuit for decoding pulses of a composite video signal comprising emitter follower stages for passing the video signal, means for decoding pulse pairs of the video signal including short and long monostable multivibrators and a pair of AND gates for producing from one of the AND gates a decoded pulse representative of a given pulse pair, said short monostable multivibrator being connected to the output of the video signal of the last emitter follower stage, a pulse separator and pulse spacing monitor circuit including a tapped delay line having said one AND gate providing it with said decoded pulse, said long monostable multivibrator being responsive to said other AND gate, said AND gates each conditioned by said short monostable multivibrator and the long monostable multivibrator, at least two terminals for receiving from the tapped delay line pulses separated in time from each other upon applying the decoded pulse to said tapped delay line, pickoff amplifier circuits for each terminal producing a pulse when a predetermined time has lapsed after the terminals have received said pulses, and a NAND gate for each pickoff amplifier circuit and each connected to be conditioned by the pickoff amplifier circuit and also connected to a means responsive to said last emitter follower stage for producing a representation of the video signal for developing in each NAND gate an acceptance pulse when the pulses of the video signal are within a predetermined spacing and the pairs of pulses are occurring cyclically repetitively.

3. A decoder and reference burst pulse spacing monitor circuit comprising a high impedance input amplifier including cascaded emitter followers, a tunnel diode coupled amplifier for providing a pulse output when the level of the high impedance amplifier has arrived at a given level, a pulse decoder for producing a decoded pulse when a pair of pulses are applied to the high impedance input amplifier and including two dissimilar time period delaying multivibrators, an AND gate responsive to each of the dissimilar multivibrators, one multivibrator being driven by said tunnel diode-coupled amplifier, a further multivibrator actuable by one AND gate and driving the other multivibrator, the other AND gate producing a decoded pulse, a delay line driven by the decoded pulse, taps on said delay line to derive pulses separated in time by the operation of the delay line, a spacing monitor and separator circuit including further a tunnel diode coupled amplifier connected to each of the taps on said delay line, a delay multivibrator driven by each of the further amplifiers, a pulser driven by the first mentioned amplifier, and a plurality of NAND gates each conditioned by the pulser, and each NAND gate being conditioned by one of the delay multivibrators which are stated to be responsive to said further amplifiers for developing an acceptance gating pulse for reference burst pulse control.

4. A decoder and reference burst pulse spacing monitor circuit for decoding a composite video input comprising at least one emitter follower stage, an amplifier-inverter connected thereto, a first tunnel diode connected to said amplifier-inverter and set to trip at a precise level on each pulse, a first pickoff amplifier responsive to said first tunnel diode and to signals from said amplifier-inverter assuring a precise reference point for measurement of pulse spacing, a first monostable multivibrator and a pulser amplifier fed by said first pickoff amplifier, a first AND gate conditioned to pass a pulse when its inputs are negative going and a second AND gate fed by said first monostable multivibrator, a second monostable multivibrator fed by said first AND gate, a differentiating circuit fed by said second monostable multivibrator, a third monostable multivibrator fed by said differentiating circuit and feeding said first and second AND gates, a tapped delay line fed by said second AND gate, a second and a third pickoff amplifier fed by said delay line, a fourth monostable multivibrator fed by said second pickoff amplifier, a fifth monostable multivibrator fed by said third pickoff amplifier, a first NAND gate fed by said fourth monostable multivibrator, a second NAND gate fed by said fifth monostable multivibrator, said pulser amplifier also feeding said first and second NAND gates, and terminal means for each NAND gate for providing an acceptance gating pulse when the pulses of the composite video are spaced and decoded within specified tolerances.

References Cited

UNITED STATES PATENTS 3,051,928  8/1962  Sullivan _____ 343—106 X

JOHN W. CALDWELL, *Acting Primary Examiner.*

J. T. STRATMAN, *Assistant Examiner.*